United States Patent
Henkel et al.

(10) Patent No.: US 6,918,836 B2
(45) Date of Patent: Jul. 19, 2005

(54) TRIPOD JOINT

(75) Inventors: Jürgen Henkel, Kernen (DE); Peter Münich, Fellbach (DE); Rolf Schröder, Stuttgart (DE); Günter Wörner, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/219,039

(22) Filed: Aug. 13, 2002

(65) Prior Publication Data

US 2003/0040366 A1 Feb. 27, 2003

(30) Foreign Application Priority Data

Aug. 23, 2001 (DE) .......................... 101 41 428
Jun. 8, 2002 (DE) .......................... 102 25 428

(51) Int. Cl.$^7$ .............................................. F16D 2/205
(52) U.S. Cl. ....................................... 464/111; 464/905
(58) Field of Search ................................. 464/111, 112, 464/120, 122, 167, 905

(56) References Cited

U.S. PATENT DOCUMENTS

| | | | |
|---|---|---|---|
| 3,381,497 A | | 5/1968 | Allen |
| 4,619,628 A | | 10/1986 | Orain |
| 4,684,356 A | * | 8/1987 | Kimata et al. ............... 464/111 |
| 4,729,670 A | * | 3/1988 | Murphy et al. ............... 384/44 |
| 4,768,990 A | * | 9/1988 | Farrell et al. ............... 464/111 |
| 4,830,516 A | * | 5/1989 | Davenport et al. ............ 384/44 |
| 4,840,600 A | * | 6/1989 | White et al. ................ 464/111 |
| 5,073,144 A | * | 12/1991 | Stenglein et al. ............ 464/111 |
| 5,160,298 A | * | 11/1992 | Schneider .................... 464/111 |
| 5,169,239 A | * | 12/1992 | Schneider .................... 464/111 |
| 5,348,512 A | * | 9/1994 | Hodge ........................ 464/111 |
| 5,628,687 A | * | 5/1997 | Genestre et al. ............ 464/111 |
| 6,165,075 A | | 12/2000 | Kita et al. |

FOREIGN PATENT DOCUMENTS

| | | |
|---|---|---|
| DE | 38 16 646 | 12/1988 |
| FR | 2 506 872 | 12/1982 |
| JP | 63-043027 | 2/1988 |
| JP | 11-082532 | 3/1999 |
| WO | 02/44573 | 6/2002 |

* cited by examiner

Primary Examiner—Kenneth Thompson
(74) Attorney, Agent, or Firm—Kenyon & Kenyon

(57) ABSTRACT

Tripod joints have a joint outer part and a joint inner part which are in driving connection to each other with cylindrical rolling bodies being connected in between and axial displacement and pivotability being ensured. In this case, the rolling bodies extend in rectilinear, guiding running paths of the joint outer part. The rolling bodies are mounted in a manner such that they may be displaced longitudinally via the cages but to a restricted extend radially with respect to the pressure element. The radial extent of the running paths or mating surfaces is greater than the longitudinal extent of the rolling bodies. This enables the rolling bodies to move on a path in the shape of a circular arc. The arrangement provides an improved, mechanical transmission function of the tripod joint and reduced wear as a result. The tripod joint is suitable for the displaceable and pivotable driving connection of two shaft ends, e.g., in conjunction with drive trains or side shafts of motor vehicles.

12 Claims, 4 Drawing Sheets

TRIPOD JOINT

CROSS-REFERENCE TO RELATED APPLICATIONS

The present application claims priority to application Ser. No. 101 41 428.5, filed in the Federal Republic of Germany on Aug. 23, 2001, and application Ser. No. 102 25 468.0, filed in the Federal Republic of Germany on Jun. 8, 2002, each of which is expressly incorporated herein in its entirety by reference thereto.

FIELD OF THE INVENTION

The present invention relates to a tripod joint.

BACKGROUND INFORMATION

Tripod joints are used, for example, as side shafts of motor vehicles. In this case, the tripod joints are used for transmitting driving torques between two driving elements of a drive train. The tripod joints permit a relative displacement and a relative pivoting of the driving elements to be compensated for. For the use in the case of side shafts of a motor vehicle, relative movements of this type are caused by spring deflections of the vehicle wheels.

U.S. Pat. No. 4,619,628 describes a tripod joint having a joint outer part and a joint inner part held in the latter. The joint inner part has a tripod star having pins having ball bodies. The ball bodies are accommodated pivotably in a recess of a pressure element. The pressure element is mounted moveably with respect to mating surfaces of the joint outer part via rolling bearings.

In the case of this conventional arrangement, pivoting of the joint inner part results in a movement of the pins and of the pressure element on a circular path. This changes the distance of the pressure element from the longitudinal axis of the joint outer part. The rolling bodies are guided in rectilinear guide grooves in the joint outer part. The different boundary conditions of the rolling bodies on the pressure element, on the one hand (circular path), and on the joint outer part, on the other hand (rectilinear movement), have to be compensated for by a sliding movement of the rolling bodies with respect to the pressure element in the longitudinal direction of the rolling bodies, which causes increased amounts of sliding. As a result, during three-dimensional movements of the tripod joint, mechanical impairments of the transmission function may occur, which, in the worst case, may result in the drive train being caused to vibrate and/or to produce noise and in resultant impairments of comfort. Furthermore, the rolling bodies having associated cages are guided in grooves of the joint outer part, which grooves require an increased outlay on manufacture for the production of the joint outer part.

German Published Patent Application No. 38 16 646 describes a tripod joint without guide grooves in the joint outer part. In this joint, however, the rolling contact is made with rolling bodies revolving around the ball body, which causes an increased outlay on construction. This type of construction also has the disadvantage of requiring play kinematically in the joint in the circumferential direction as a consequence of the revolving rolling bodies. This play may be perceptible as an impact during changes of load. Moreover, the tripod joint is expensive because of the multiplicity and complexity of the structural elements.

It is an object of the present invention to provide a tripod joint which is improved with regard to the outlay on components and manufacturing and/or to the mechanical transmission behavior.

SUMMARY

The above and other beneficial objects of the present invention are achieved by providing a tripod joint as described herein.

The essentially cylindrical rolling bodies are arranged in cages having longitudinal axes which are positionally fixed with respect to the cages. As a result, the rolling bodies may be guided in an optimum manner, and, in particular, the rolling bodies together with the cages form a constructional or installation unit. Furthermore, disadvantageous revolving arrangements with the rolling bodies with regard to the multiplicity and complexity of components and construction space may be avoided. The cages are mounted in a longitudinally displaceable manner with respect to the pressure element. This may ensure longitudinal displaceability of the two joint parts.

Furthermore, the movement of the cages with respect to the pressure element in the radial direction is restricted via shoulders engaging around or enclosing the pressure element. The shoulders therefore provide a radial region in which the rolling bodies with the cages may move with respect to the pin. In this case, the shoulders form stops for the cage or the rolling bodies. The radial extent of the mating surfaces is greater, at least in subregions, than the longitudinal extent of the rolling bodies or the radial extent of the cages guiding the rolling bearings, with the result that curved paths of the cages having the rolling bodies are made possible. When the associated pin is pivoted, the cage with the rolling bodies does not therefore execute a translatory movement on the mating surface, but rather the cages come to bear against the shoulders, with the result that the cages are pivoted on a curved path at the radius predetermined by the distance of the shoulders from the pivot axis.

In the present case, guidance of the cage or of the rolling bodies by the joint outer part on a fixed or translatory path may not occur. The consequence of this is that guide forces may be reduced or avoided, which may cause an improvement in the transmission behavior because undesirable interfering forces are done away with. Furthermore, a reduction in the wear which occurs in the region of otherwise necessary guide surfaces may be obtained. Moreover, as a consequence of a play predetermined by the distance of the shoulders, the repeated movement of the rolling bodies does not occur on identical paths, but rather a movement occurs on different paths, depending in each case on the displacement and pivoting of the tripod joint. During operation of the tripod joint, this causes a relatively large compact surface to be used for supporting the rolling bodies, which causes a smaller material stress in the region of the running or mating surfaces of the joint outer part. In the case of the configuration according to the present invention, it is possible that the components may not require any play in the circumferential direction. The components may even be built over with a lightweight covering. This may result in a further improvement in the mechanical transmission behavior.

The movement of the cages with respect to the pressure element in the radial direction may be guided in a play-free manner via shoulders engaging around or enclosing the pressure element. According to this configuration, an exact guidance of the cages may be ensured (within the scope of the elasticity of the shoulders), without complicated guide grooves having to be made in the mating surfaces.

Each pin on opposite sides may be assigned two cages which are connected to each other. In this case, the cages may be of single-piece configuration or connected to each other via mechanical connecting arrangement. The mechanical connecting arrangement may be of elastic configuration in order to simplify the installation. As a consequence of the connection, the movements of the two cages are coupled to one another thereby resulting in an improved transmission behavior of the tripod joint. Furthermore, cages, rolling bodies, pressure element and pin form an installation unit which may be handled easily.

According to an example embodiment of the present invention, at least one cage may be coupled in the rolling direction of the rolling bodies to the pressure element via a connecting element. The connecting element may be a centering element or spring element which restricts the movement of the cage or, for example, may ensure a restoring force into a central position of the cage with respect to the pressure element.

According to an example embodiment of the present invention, the joint outer part has receiving spaces for the pins, the receiving spaces having, in cross-section, an essentially U-shaped contour, the parallel side limbs of the contour being of rectilinear configuration radially inwardly, and at least partially forming the mating surfaces.

Receiving spaces configured in this manner may be produced in a particularly simple manner, since grooves having mating surfaces of high surface quality forming the groove base may not have to be produced. Rather, the joint outer part may be produced, for example, in a forging process. In the simplest case, the joint outer part may be forged to completion before or after a heat treatment (hardening) without being cut. As an alternative or in addition, the running paths may be produced by axial and/or radial insertion of a tool into the joint outer part. The pressure elements and the partially spherical recess thereof may be machined to completion by forging. If required, a calibrating or surface-grinding process may be undertaken as the final machining step in order to improve the rolling surface of the pressure elements.

Exemplary embodiments of the tripod joint according to the present are explained in greater detail below with reference to the Figures.

DETAILED DESCRIPTION

Figure 1:
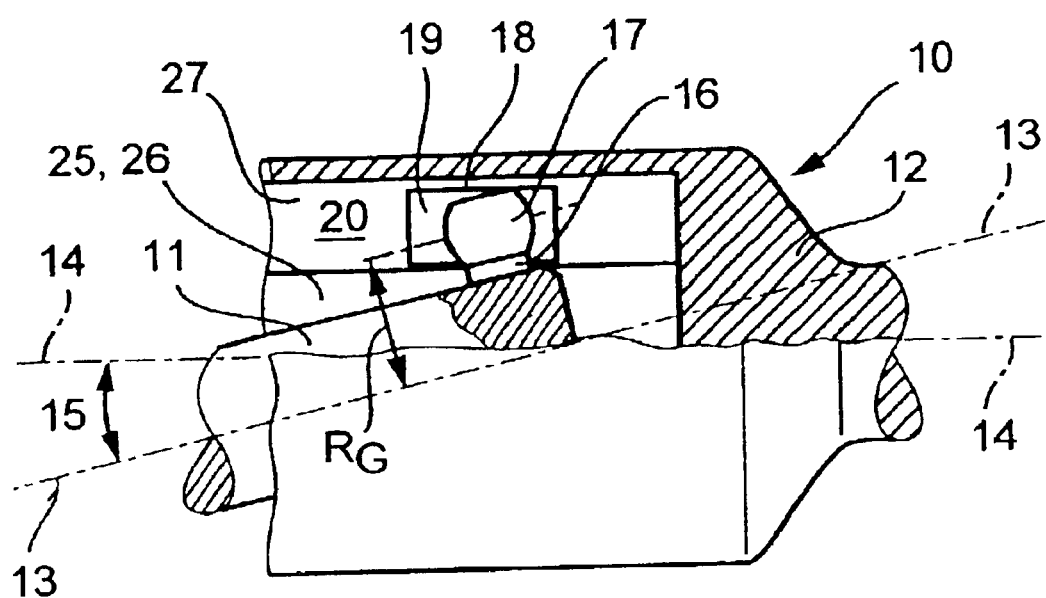
FIG. 1 is a longitudinal cross-sectional view of a tripod joint according to the present invention.

A tripod joint 10 has a joint inner part 11 and a joint outer part 12 holding the latter. The joint inner part 11 and the joint outer part 12 are in each case connected, at least in a rotationally fixed manner, to a driving element of a drive train of a motor vehicle, for example to a drive shaft and a vehicle wheel. The tripod joint 10 is used for transmitting a driving torque between the joint inner part 11 and the joint outer part 12 while ensuring a relative displacement along the longitudinal axis 13—13 of the joint inner part 11 and along the longitudinal axis 14—14 of the joint outer part 12, a relative pivoting of the joint inner part 11 with respect to the joint outer part 12, which pivoting is associated with a change in the angle 15 between the longitudinal axes 13—13 and 14—14, and a three-dimensional movement which rises from a combination of the abovementioned forms of movement.

The joint inner part 11 has, at the end located on the inside, three pins 16 which are formed as a single piece or a number of pieces together with the latter, are orientated radially and are distributed in each case at 120° in the circumferential direction and form a tripod star. The pins 16 have in each case a partially spherical ball body 17. In order to transmit forces in both circumferential directions, the ball body 17 bears, in each case in the region of the spherical lateral surface, against a correspondingly configured recess 18 of a pressure element 19. On the opposite side of the pressure element 19, which side faces a flat mating surface 20 of the joint outer part 12, the pressure element is of flat configuration with a running surface 21.

The running surface 21 and the mating surface 20 are orientated parallel to each other. Cylindrical rolling bodies 23, e.g., rollers or needles, are held between the latter forming a linear contact. A plurality of rolling bodies are guided in a cage 24 so that the relative position of the longitudinal axes of the rolling bodies with respect to the cages does not change substantially. In order to transmit circumferential forces in the opposite direction, each pin 16 is configured with two associated pressure elements 19, the rolling bodies 23 and the surfaces 20, 21 symmetrically to a pin central plane accommodating the longitudinal axis 13—13.

The running surface 21 of a pressure element 19 may have a rectangular form, with the result that as many rolling bodies 23 as possible form a load-bearing contact with the surface pressure being reduced. However, circular or oval pressure elements 19 are also possible.

The joint outer part 12 has a recess 25 orientated in the direction of the longitudinal axis 14-14 with an essentially circular, central hole 26 and three receiving spaces 27 which are orientated radially and are distributed in each case at 120° C. in the circumferential direction and are used in each case for holding and supporting a pin 16, two pressure elements 19 and rolling bodies 23. In the section illustrated in FIG. 2, the receiving spaces 27 have an essentially U-shaped contour open in the direction of the hole 26, the side limbs of the U-shaped contour being formed by the mating surfaces 20. In the exemplary embodiment illustrated in FIG. 2, the side limbs-are of rectilinear configuration without a transitional region to the mating surfaces 20. In the direction of the hole 26, the side limbs do not, in particular, have any projections or depressions, but rather merge into the hole 26 in the end region arranged on the inside with an enlargement of the spacing. In the position of the tripod joint illustrated in FIG. 2, the rolling bodies together with the cage are arranged spaced apart radially from the main limb of the U-shaped contour.

Figure 4:
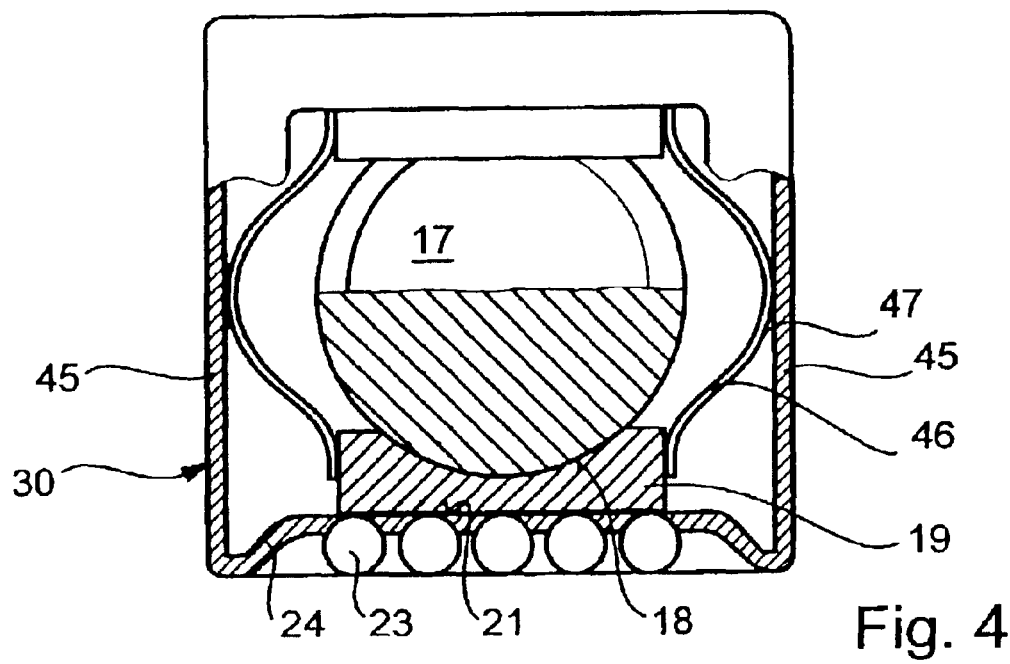
FIG. 4 is a cross-sectional view of a joint pin according to the present invention with pressure element, moving cage, rolling bodies and centering elements taken along the line A—A illustrated in FIG. 2
Figure 5:
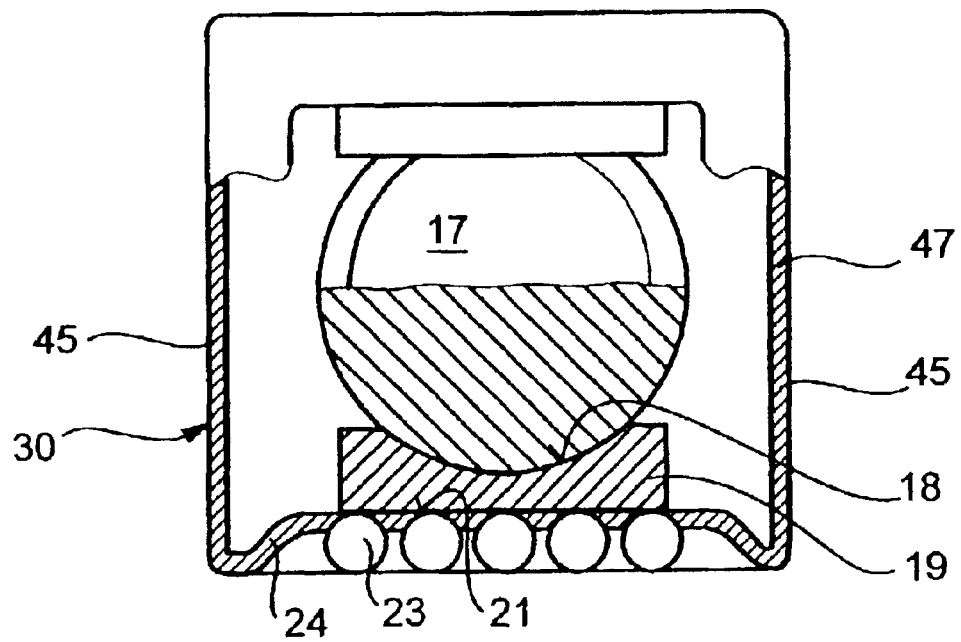
FIG. 5 is a cross-sectional view of a joint pin according to the present invention with pressure element, moving cage and rolling bodies taken along the line A—A illustrated in FIG. 2.

Two pressure elements 19 and two cages 24 may be used per pin 16. As an alternative, the two pressure elements 19 may be connected to each other via connecting regions to form a pressure body 29 (FIG. 3) and/or the two cages 24 may be configured as a single-piece cage 30 (FIG. 4, FIG. 5). The single-piece cages may be of square, rectangular, annular or cup-shaped configuration, for example, may be entirely or partially closed radially outwardly.

Figure 2:
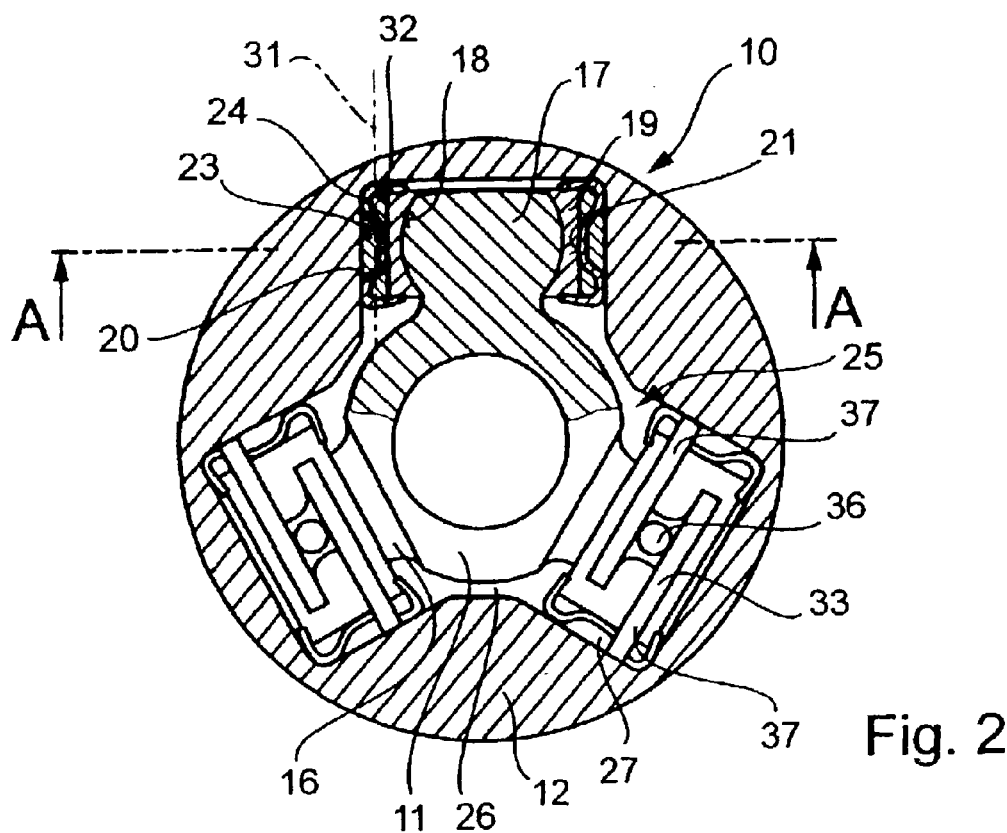
FIG. 2 is a cross-sectional view of a tripod joint according to the present invention.

As illustrated in FIG. 2, the rolling bodies 23 are guided in a cage 24. The rolling bodies 23 are guided in the cages 24 with the relative position of the longitudinal axes 31 of the rolling bodies 23 with respect to each other being ensured. The cages 24 are guided in the radial direction with respect to the pressure element 19 via shoulders 32 engaging around and enclosing the pressure element 19. The cages 24 may be "clipped" via the shoulders 32 onto the pressure element 19, as illustrated. The cages 24 may furthermore be centered in the running direction of the rolling bodies 23 via centering or spring elements 33. Two cages 24 of the pin 16 may be guided and centered via a common spring element 33.

Figure 3:
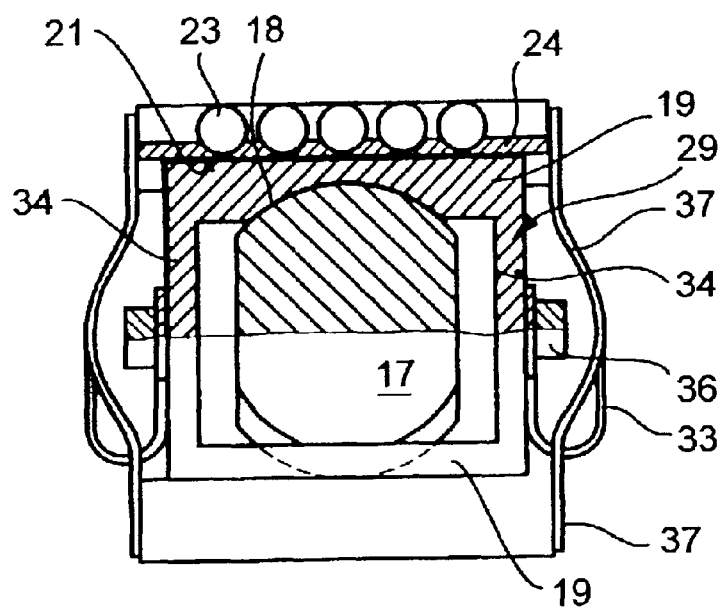
FIG. 3 is a cross-sectional view of a joint pin according to the present invention with pressure body, cage, rolling bodies and centering elements taken along the line A—A illustrated in FIG. 2.

According to the exemplary embodiment illustrated in FIG. 3, the pressure elements 19 assigned to a ball body 17 may be connected via two connecting webs 34 to form a pressure body 29 configured as a single piece. An introduction of the ball body 17 into the single-piece pressure body 29 may be ensured by a configuration, such as a bayonet connection.

According to the exemplary embodiment illustrated in FIG. 2, FIG. 3, two spring elements 33 are connected to the pressure element 19, of the pressure body 29 or the ball body 17 via a respective fastening arrangement 36. The spring elements 33 have in each case two elastic fingers 37 which bear against the opposite cages 30 or are connected thereto, for the purpose of supporting them.

According to the manner in which the rolling bodies 23 are connected to the ball body 17, as illustrated in FIGS. 2 and 3, during each revolution of the tripod joint 10 the cage 24 executes a curved pivoting movement. The rolling path of the cage 24 is automatically established on the mating surface 20 due to the effective inner and outer guiding forces of the rolling bodies 23. The kinematic limits of the pivoting movement are formed by the geometry of the cage 24 and, especially, of the joint outer part 12. In borderline situations during operation of the tripod joint, a controlling contact of the pressure element 19 by the end stops of the cage 24 or else a radial contact of cage 24 and joint outer part 12 may occur. These contacts do not have a negative effect on the operating comfort of the tripod joint 10, since the forces occur stochastically only in borderline situations and therefore do not constitute a periodic excitation.

According to the exemplary embodiment illustrated in FIG. 4, the cages 24, which are arranged on the opposite sides of the ball body 17, are connected to each other via connecting regions 45 to form a single-piece cage 30. In this case, it may be ensured that the position of the cages 24 in the running direction coincides. A centering of the cage 30 with respect to the pressure element 19, pressure body 29 or the ball body 17 may occur via one or two spring elements 33 of simplified configuration. In the exemplary embodiment illustrated in FIG. 4, two compression springs 46 are arranged in the running direction on both sides of the pressure elements 19. The compression springs 46 are configured as leaf springs with a central bulge 47, the end regions of which are supported on the pressure elements 19 and which bear in the region of the bulge 47 against a connecting region 45.

Figure 6:
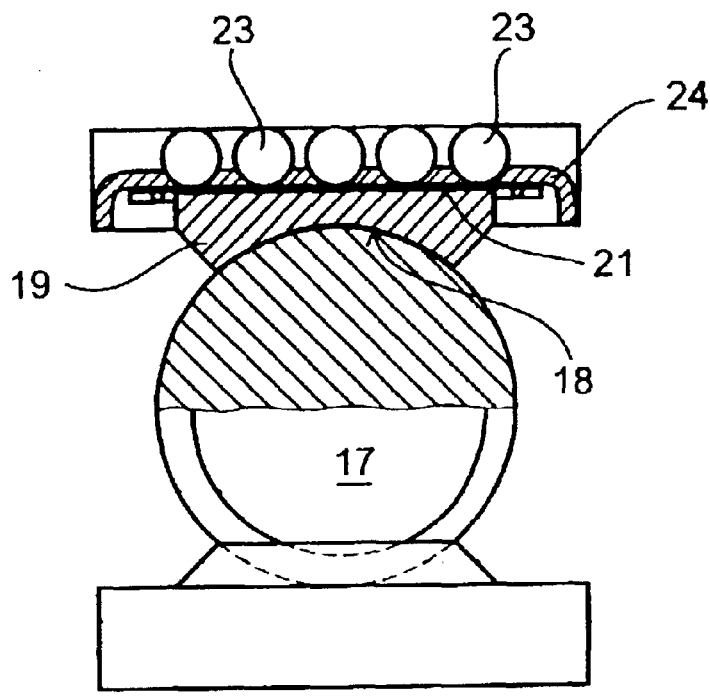
FIG. 6 is a cross-sectional view of a joint pin according to the present invention with pressure element, moving cage and rolling bodies taken along the line A—A illustrated in FIG. 2.

In the exemplary embodiment illustrated in FIG. 5, the cage 30 is configured in accordance with FIG. 4. In the exemplary embodiment illustrated in FIG. 6, the cage 24 and the pressure element 19 are configured as separate components for each side and are not connected to each other.

In the case of cylindrical rolling bodies 23, the latter may have a contour which is slightly curved in the longitudinal direction of the lateral surface, as a result of which the amount of sliding in the case of a movement component in the direction of the longitudinal axis 31 of the rolling bodies 23 or in the case of rotational movements of the rolling bodies transversely with respect to the longitudinal axis 31 may be further reduced.

Figure 7:
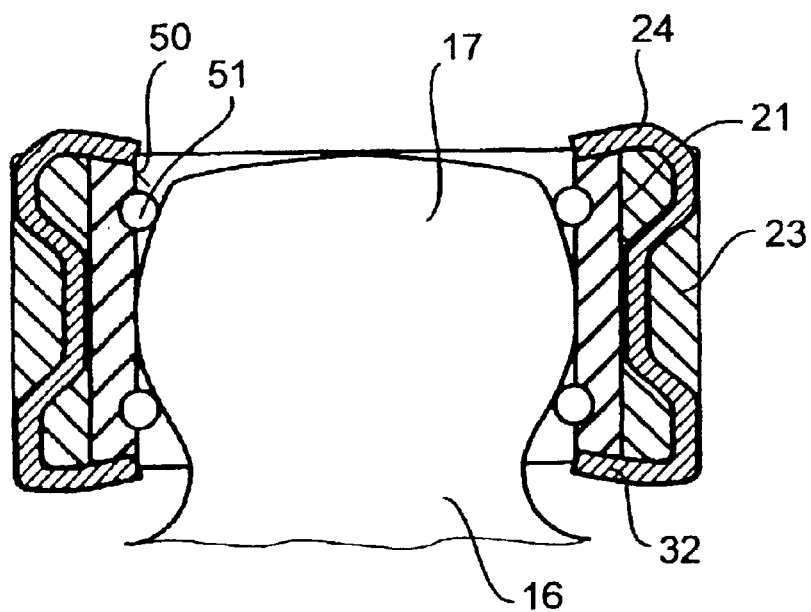
FIG. 7 is a cross-sectional view of a joint pin according to the present invention with pressure element, moving cage Sand rolling bodies taken transverse with respect to the longitudinal axis 13—13.

In comparison with the ball body 17, the cage 24, 30 having the rolling bodies has, e.g., just two degrees of freedom: a suitably selected connection of the ball body 17 to the pressure element 19 may ensure pivotability about an axis perpendicular with respect to the plane defined by the longitudinal axis 13—13 of the joint inner part 11 and the longitudinal axis of the pins 16. The second degree of freedom is the connection between cage 24, 30 and pressure element 19, 29, which connection may be displaced in a translatory manner. In order to ensure the pivotability of the pressure element 19, 29 with respect to the ball body 17, the pressure element 19, 29 may hold the ball body 17 in a universal ball joint. The universal ball joint may be formed in a conventional manner with planar bearing surfaces or else (partially) with a plurality of line contacts which are produced, for example, by a hole 50 on which the ball body 17 is guided, and further guide rings 51 inserted into the hole 50, cf. FIG. 7.

In the event of being configured as cylindrical rollers, the rolling bodies 23 may be arranged in the cages 24, 30 with longitudinal axes 31 which are parallel or are inclined at an acute angle.

A radial orientation denotes an orientation transverse with respect to one of the longitudinal axes 13—13, 14—14.

The exemplary embodiments described involve configuration only given by way of example. A combination of the described features for different exemplary embodiments is possible. Further features, in particular features which have not been described, of the device parts belonging to the invention are to be taken from the device-part geometries illustrated in the drawings.

What is claimed is:

1. A tripod joint for transmitting a driving torque between two driving elements of a drive train, comprising:

a pressure element including parallel running surfaces;

a joint inner part including a tripod star having pins with ball bodies, the ball bodies mounted pivotably with respect to the pressure element about an axis transverse with respect to a plane defined by a longitudinal axis of the joint inner part and a longitudinal axis of the pin;

a joint outer part holding the joint inner part and including mating surfaces;

cages, each cage mounted longitudinally displaceably with respect to the pressure element, the cages including shoulders configured to restrict movement of the cage with respect to the pressure element in a radial direction, the shoulders one of engaging around and enclosing the pressure element; and essentially cylindrical rolling bodies, having longitudinal axes positionally fixed with respect to the cages, arranged between the parallel running surfaces of the pressure element and the mating surfaces of the joint outer part, the rolling bodies arranged in the cages longitudinally;

wherein a radial extent of the mating surfaces, at least in subregions, is greater than one of a longitudinal extent of the rolling bodies and a radial extent of the cage configured to guide the rolling bearings, the cages arranged to move along curved paths with the rolling bodies.

2. The tripod joint according to claim 1, wherein the joint outer part includes receiving spaces for the pins, the receiving spaces having, in cross-section, an essentially U-shaped contour, parallel side limbs of the U-shaped contour being rectilinear radially inwardly, and side limbs of the U-shaped contour at least partially forming the mating surfaces.

3. The tripod joint according to claim 1, wherein at least one cage is coupled in a rolling direction of the rolling bodies to the pressure element via a connecting element.

4. The tripod joint according to claim 1, wherein the cages having the shoulders are manufactured from sheet metal.

5. The tripod joint according to claim 1, wherein the cages are clipped via the shoulders onto the pressure element.

6. A tripod joint for transmitting a driving torque between two driving elements of a drive train, comprising:

a pressure element including parallel running surfaces;

a joint inner part including a tripod star having pins with ball bodies, the ball bodies mounted pivotably with respect to the pressure element about an axis transverse with respect to a plane defined by a longitudinal axis of the joint inner part and a longitudinal axis of the pin;

a joint outer part holding the joint inner part and including mating surfaces;

cages, each cage mounted longitudinally displaceably with respect to the pressure element; and rolling bodies, having longitudinal axes positionally fixed with respect to the cages, arranged between the parallel running surfaces of the pressure element and the mating surfaces of the joint outer part, the rolling bodies arranged in the cages longitudinally;

wherein a radial extent of the mating surfaces, at least in subregions, is greater than one of a longitudinal extent of the rolling bodies and a radial extent of the cage configured to guide the rolling bearings, the cages arranged to move along curved paths with the rolling bodies.

7. The tripod joint according to claim 6, wherein the joint outer part includes receiving spaces for the pins, the receiving spaces having, in cross-section, an essentially U-shaped contour, parallel side limbs of the U-shaped contour being rectilinear radially inwardly, and side limbs of the U-shaped contour at least partially forming the mating surfaces.

8. The tripod joint according to claim 6, wherein the cages are clipped via the shoulders onto the pressure element.

9. A tripod joint for transmitting a driving torque between two driving elements of a drive train, comprising:

a pressure element including parallel running surfaces;

a joint inner part including a tripod star having pins with ball bodies, the bail bodies mounted pivotably with respect to the pressure element about an axis transverse with respect to a plane defined by a longitudinal axis of the joint inner part and a longitudinal axis of the pin;

a joint outer part holding the joint inner part and including mating surfaces;

cages, each cage mounted longitudinally displaceably with respect to the pressure element, the cages including shoulders configured to restrict movement of the cage with respect to the pressure element in a radial direction, the shoulders one of engaging around and enclosing the pressure element; and essentially cylindrical rolling bodies, having longitudinal axes positionally fixed with respect to the cages, arranged between the parallel running surfaces of the pressure element and the mating surfaces of the joint outer part, the rolling bodies arranged in the cages longitudinally;

wherein a radial extent of the mating surfaces, at least in subregions, is greater than one of a longitudinal extent of the rolling bodies and a radial extent of the cage configured to guide the rolling bearings, the cages having the rolling bodies having curved paths, wherein the shoulders are configured to guide movement of the cages with respect to the pressure element in a play-free manner in the radial direction, the shoulders engaging around and enclosing the pressure element.

10. A tripod joint for transmitting a driving torque between two driving elements of a drive train, comprising:

a pressure element including parallel running surfaces;

a joint inner part including a tripod star having pins with ball bodies, the ball bodies mounted pivotably with respect to the pressure element about an axis transverse with respect to a plane defined by a longitudinal axis of the joint inner part and a longitudinal axis of the pin;

a joint outer part holding the joint inner part and including mating surfaces;

cages, each cage mounted longitudinally displaceably with respect to the pressure element, the cages including shoulders configured to restrict movement of the cage with respect to the pressure element in a radial direction, the shoulders one of engaging around and enclosing the pressure element; and essentially cylindrical rolling bodies, having longitudinal axes positionally fixed with respect to the cages, arranged between the parallel running surfaces of the pressure element and the mating surfaces of the joint outer part, the rolling bodies arranged in the cages longitudinally;

wherein a radial extent of the mating surfaces, at least in subregions, is greater than one of a longitudinal extent of the rolling bodies and a radial extent of the cage configured to guide the rolling bearings, the cages having the rolling bodies having curved paths;

wherein the joint outer part includes receiving spaces for the pins, the receiving spaces having, in cross-section, an essentially U-shaped contour, parallel side limbs of the U-shaped contour being rectilinear radially inwardly, and side limbs of the U-shaped contour at least partially forming the mating surfaces; and wherein the side limbs of the U-shaped contour are configured without a step.

11. A tripod joint for transmitting a driving torque between two driving elements of a drive train, comprising:

a pressure element including parallel running surfaces;

a joint inner part including a tripod star having pins with ball bodies, the ball bodies mounted pivotably with respect to the pressure element about an axis transverse with respect to a plane defined by a longitudinal axis of the joint inner part and a longitudinal axis of the pin;

a joint outer part holding the joint inner part and including mating surfaces;

cages, each cage mounted longitudinally displaceably with respect to the pressure element, the cages including shoulders configured to restrict movement of the cage with respect to the pressure element in a radial direction, the shoulders one of engaging around and enclosing the pressure element; and essentially cylindrical rolling bodies, having longitudinal axes positionally fixed with respect to the cages, arranged between the parallel running surfaces of the pressure element and the mating surfaces of the joint outer part, the rolling bodies arranged in the cages longitudinally;

wherein a radial extent of the mating surfaces, at least in subregions, is greater than one of a longitudinal extent of the rolling bodies and a radial extent of the cage configured to guide the rolling bearings, the cages having the rolling bodies having curved paths, wherein each pin on opposite sides is assigned two cages connected to each other.

12. A tripod joint for transmitting a driving torque between two driving elements of a drive train, comprising:

a pressure element including parallel running surfaces;

a joint inner part including a tripod star having pins with ball bodies, the ball bodies mounted pivotably with respect to the pressure element about an axis transverse with respect to a plane defined by a longitudinal axis of the joint inner part and a longitudinal axis of the pin;

a joint outer part holding the joint inner part and including mating surfaces;

cages, each cage mounted longitudinally displaceably with respect to the pressure element; and rolling bodies, having longitudinal axes positionally fixed with respect to the cages, arranged between the parallel running surfaces of the pressure element and the mating surfaces of the joint outer part, the rolling bodies arranged in the cages longitudinally;

wherein a radial extent of the mating surfaces, at least in subregions, is greater than one of a longitudinal extent of the rolling bodies and a radial extent of the cage configured to guide the rolling bearings, the cages having the rolling bodies having curved paths, wherein the joint outer part includes receiving spaces for the pins, the receiving spaces having, in cross-section, an essentially U-shaped contour, parallel side limbs of the U-shaped contour being rectilinear radially inwardly, and side limbs of the U-shaped contour at least partially forming the mating surfaces, and wherein the side limbs of the U-shaped contour are configured without a step.

* * * * *